United States Patent

[11] 3,573,510

[72] Inventor Charles W. Otto
 DeKalb, Ill.
[21] Appl. No. 831,592
[22] Filed June 9, 1969
[45] Patented Apr. 6, 1971
[73] Assignee General Electric Company

[54] CUSHION THRUST WASHER
 14 Claims, 13 Drawing Figs.
[52] U.S. Cl. .................................................. 308/132
[51] Int. Cl. .................................................. F16c 1/24
[50] Field of Search .......................................... 308/132,
 135, 163

[56] References Cited
 UNITED STATES PATENTS
 3,235,317 2/1966 Cunningham ................ 308/132
Primary Examiner—Martin P. Schwadron
Assistant Examiner—Frank Susko
Attorneys—John M. Stoudt, Radford M. Reams, Jon C.
 Gealow, Frank L. Neuhauser and Oscar B. Waddell ABSTRACT: A unitary, imperforate disclike thrust washer member carried by a dynamo electric machine rotor shaft is annularly recessed on one face with one recess wall slotted at spaced circumferential positions to form a plurality of flexible spring fingers which extend axially beyond a rigid thrust runner, and annularly recessed on the opposite face to form a cone-shaped oil pumping surface.

3,573,510
2 Sheets-Sheet 1
FIG. 1
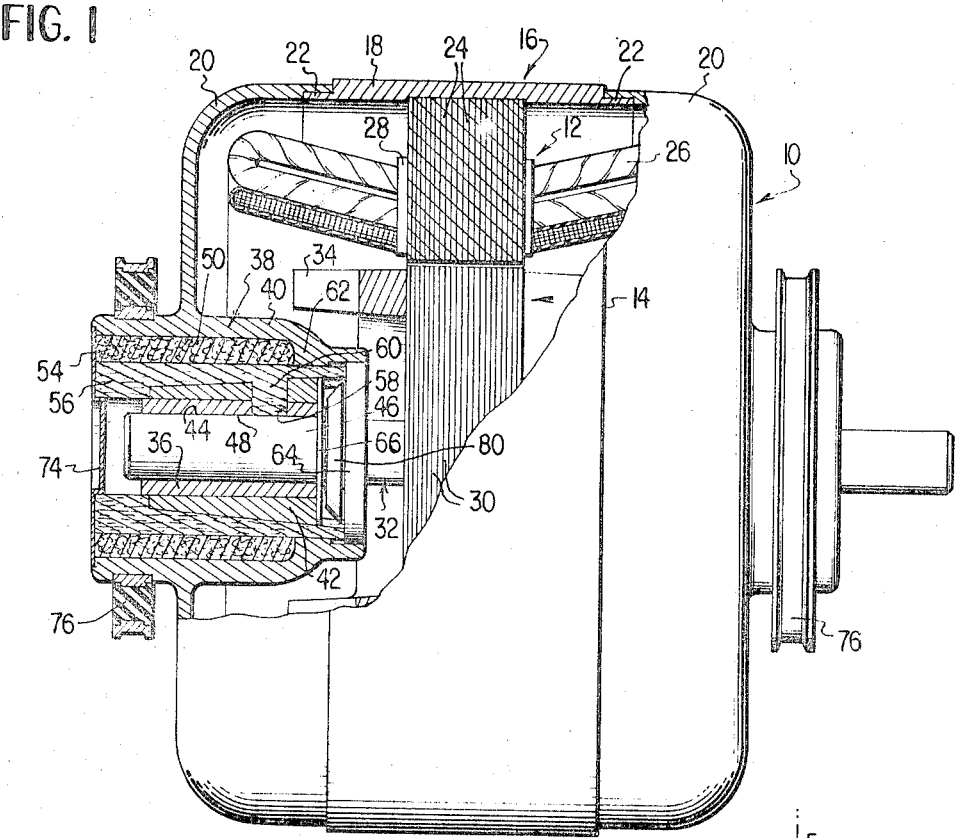
FIG. 2
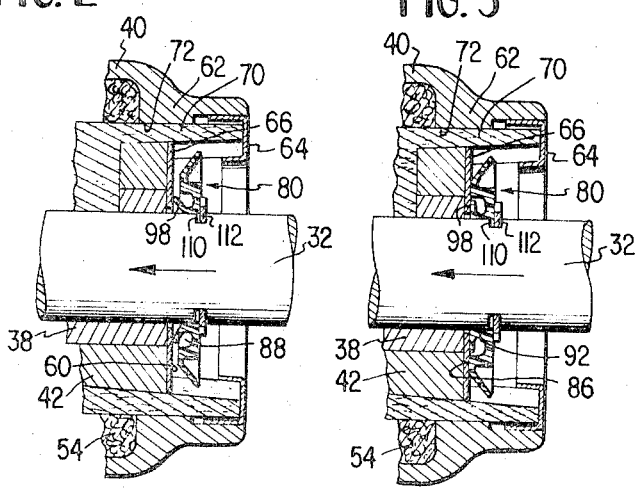
FIG. 3
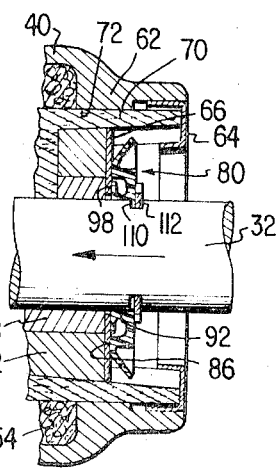
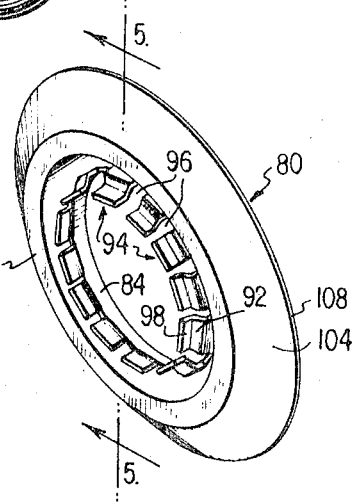
FIG. 4
INVENTOR
CHARLES W. OTTO
BY John M. Stoudt
ATTORNEY Patented April 6, 1971

INVENTOR
CHARLES W. OTTO

BY John M. Stoudt

ATTORNEY

CUSHION THRUST WASHER

BACKGROUND OF THE INVENTION

Field of the Invention

This invention relates to electric motors and other apparatus having rotatable parts and more particularly to an improved cushion thrust bearing and oil slinger arrangement for the same.

In dynamo electric devices such as electric motors of the squirrel-cage-type, as a result of axial vibration the rotor and shaft assembly tends to bump into the relatively stationary stator components. For this reason, a wear or thrust washer is conventionally carried by the rotor shaft intermediate of the squirrel-cage rotor and a stationary thrust shoulder generally formed by the end of a stationary bearing. Axial vibration gives rise to a knocking or bumping sound which is extremely objectionable. Additionally, for proper motor operation the axial shifting of the shaft with respect to the stator components must be limited since excessive end play is detrimental to machine performance.

In fractional horsepower motors, low cost, sleeve-type bearings are normally employed for supporting the rotor shaft with respect to the stator housing. During motor operation, there is a tendency for the lubricating oil to seep along the shaft from the bearings toward the interior of the rotor. Seals have been employed for maintaining the lubricating oil in the vicinity of the sleeve bearings. Alternatively, radially inclined surfaces are carried by the rotor for directing, under centrifugal force, oil flow both radially and axially to a spaced, concentric lubricant reservoir. The stationary reservoir is filled with porous wick material for directing by capillary action, the lubricant to the middle of the sleeve bearing, thus insuring continued recirculation of the oil and proper lubrication between the journal and the bearing.

The axial thrust bearing and oil slinger arrangement for such motors have in the past, involved separate components which perform the individual functions of; an oil barrier to prevent inward seepage of oil along the shaft periphery, a rigid thrust runner for limiting axial shifting of the rotor with respect to the stator components, an oil slinger for receiving centrifugally discharged oil from the motor shaft and pumping the same to the stationary oil reservoir and axial spring means for resiliently resisting low axial thrust loads prior to contact between the thrust runner and a stationary thrust receiving plate.

Attempts have been made to consolidate in a single component or element, the four functions outlined above. One representative arrangement is shown in U.S. Pat. No. 2,984,528 to P. B. Shaffer, which issued May 16, 1961 and is assigned to the common assignee. The thrust bearing arrangement of that patent operates satisfactorily to initially resist axial shifting of the rotor shaft with respect to the stator while subsequently allowing contact between the thrust runner and the stationary thrust receiving surface. However, it carries a plurality of circumferential slots to provide the necessary resilience between the initial thrust contact surface and the rigid thrust runner. These circumferential slots allow the free passage of lubricating oil inwardly of the rotor, resulting in loss of lubrication, and the accumulation of oil on the rotor bars and rotor laminations during normal operation. At the same time, while the portion of the element which connects the outer and initial thrust face surface with the inner rigid thrust runner partially acts as an oil slinger for a portion of the lubricating oil centrifugally discharged from the rotating shaft, there is no assurance that the major portion of the lubricating oil is recirculated to the stationary oil reservoir surrounding the porous sleeve bearing.

SUMMARY OF THE INVENTION

This invention is directed to a unitary thrust bearing member for use in electric motor having a rotor carried by a rotor shaft and supported within a stationary sleeve bearing. The unitary thrust member is disc-shaped including a hub portion having an axially extending bore for mounting the same on the shaft intermediate of the rotor and the inner end of the sleeve bearing. A first annular recess is formed within one end face of the disc to form an inner, thin wall flange of an axial length in excess of the lateral thickness of the remaining portion of the hub. The thin wall flange is slotted at circumferentially spaced locations to form resilient fingers, the ends of which, in the free state, extend radially inward. The outer hub end face further includes a rigid annular portion which acts as a thrust runner for contact with the thrust receiving means of the stator. On the opposite end face of the disc there is provided a second annular recess to define an outwardly inclined circumferential or cone-shaped surface for pumping collected lube oil radially outwards and into a stationary reservoir of the stator. The disc is imperforate to form a complete axial oil barrier for oil seeping along the shaft periphery from the bearing towards the rotor.

The resilient fingers have their free end reversely turned, or inwardly inclined and may be individually apertured to offer greater resilience. Preferably, the unitary thrust bearing member is formed of nylon, or of a nylon material such as that presently sold by the Polymer Corporation under the registered trademark "Nylatron GS."

BRIEF DESCRIPTION OF THE DRAWING

FIG. 1 is a side elevational view of an electric motor, partially broken away and in section to illustrate the thrust bearing arrangement of the present invention.

FIG. 2 is an enlarged, sectional view of a portion of the structure shown in FIG. 1, illustrating the thrust bearing arrangement of the present invention in one form under light axial thrust load conditions.

FIG. 3 is a similar view to that of FIG. 2, with the thrust bearing arrangement under heavier axial thrust load conditions.

FIG. 4 is a perspective view of the improved thrust bearing member of the present invention as employed in the arrangement of FIGS. 1 through 3.

DESCRIPTION OF THE PREFERRED EMBODIMENT

Figure 5:
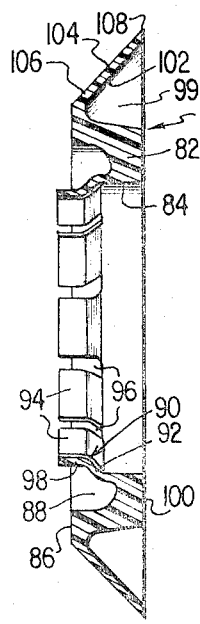
FIG. 5 is a sectional view of the thrust member shown in FIG. 4 in relaxed condition prior to coupling the same to the rotor shaft.

Referring to FIG. 1 of the drawing, the invention is shown as applied to a small electric motor 10 of the conventional, squirrel-cage induction type. The motor constitutes a stator 12, and a rotor 14 which are contained within a motor housing or frame 16. The motor frame as illustrated consists of three members, a cylindrical central portion 18 and a pair of end shields or frame members 20 which are rabbeted together at 22 in conventional fashion. The stator 12 is conventional and consists of a plurality of stacked, thin laminations 24 of magnetic material with energizing coils 26 carried by slots (not shown) provided therein. The coils are insulated from the laminations by insulation means 28. The rotor 14 also comprises a stack of thin laminations 30, secured to shaft 32 in any suitable fashion and having cast within suitable slots (not shown) windings 34 of the squirrel-cage-type which may be die cast in accordance with conventional practice.

The shaft 32 is rotatably supported on opposite sides of the rotor by stationary sleeve-type bearings 36 which in turn are carried by the end shields 20 or end frame members in any suitable manner. For simplicity of illustration, only one end of the rotor and shaft assembly and the associated supporting means is illustrated in detail in FIG. 1 but it is to be understood that the other end of the assembly is supported in the identical manner. The bearing 36 is fixedly secured within a substantially cylindrical bearing housing 38 formed as an integral part of the end shield 20. While the manner of fixedly securing the bearing within the bearing housing 38 is immaterial to the present invention, housing 38 may be provided for instance with an inwardly projecting wall 40 and an integral spider (not shown) which terminates in a longitudinally extending, centrally located bearing support 42 having the sleeve bearing 36 rigidly mounted therein. With this type of construction, the rotor shaft 32 has a bearing support surface 44 formed by the engagement of the shaft end portion 46 with the inner surface 48 of the sleeve bearing.

Conventionally, for lubricating the bearing surfaces of the shaft 32 a lubricant reservoir 50 is provided within bearing housing 38 which surrounds the bearing support 42. This reservoir is filled with lubricant retaining means such as lubricant absorbent wick material 54 which is composed of loose wool and an oil impregnated felt pad 56 which functions as a wick means. For supplying lubricant from the lubricant reservoir to the bearing surfaces, a lubricant feed passage 58 is disposed on the upper side of the sleeve bearing and the associated sleeve bearing support. A portion 60 of the pad or wick is positioned within this passage and is in direct communication between the lubricant reservoir 50 and the shaft portion 46. Oil or other fluid lubricant is placed in the reservoir and is subsequently absorbed by the loose wool and the wick with the oil being fed at a predetermined rate to the shaft portion 46 for lubricating the same.

The baring housing is flanged at 62 which flange extends axially inwardly, beyond a stationary thrust receiving means in the form of the inner face 60 of the thrust receiving disc 66.

As seen in greater detail in FIGS. 2 and 3, flange 62 surrounds a plurality of axially extending wick sections 70 which correspond to the number of bearing housing openings 72 providing in the housing wall. Thus, any lubricant which is thrown outwardly from the shaft during rotation may be caught by the wick sections 70 and returned to the reservoir 50 for reuse. This arrangement is conventional. However, to insure against leakage of the lubricant into the interior part of the motor and specifically in contact with the rotor bars, a metallic cap 64, which is U-shaped in cross section, is mounted within the flange 62 and receives the extending ends of each of the wick sections 70 to overlie the same.

The hub of the bearing housing carries a pressed cup 74 which encloses the lubricant reservoir 50 while resilient motor mountings 76 are provided at either end of the motor on the frame member 20 allowing the motor to be supported by a standard motor support base (not shown) by conventional clamping means (not shown).

The present invention is directed to an improved thrust bearing arrangement and in the preferred embodiment, a unitary thrust bearing member or thrust washer 80 which is more clearly illustrated in FIGS. 4 and 5 is preferably formed of a tough, war resistant material having a self-lubricating property for example or a material of which nylon is a principal component such as a material presently sold by the Polymer Corporation under the trademark "Nylation GS."

The thrust bearing member 80 comprises a configured disc having as its major portion, a hub 82 having an axially extending bore 84 on the order of that of the rotor shaft to which it is coupled so as to rotate therewith. The outer end face 86 is flat and acts as the thrust runner. This face carries an annular recess 88 which defines in conjunction with bore 84 a relatively thin flange portion 90 which, as indicated in FIG. 5 in the relaxed condition has an intermediate portion 92 which extends radially inward and a terminal portion 98 which extends parallel to the disc axis. Further, flange 90 is slotted at 96 at circumferentially-spaced locations to form individual flexible fingers 94 whose inner diameter when relaxed is less than that of the rotor shaft receiving the same. Thus, when the thrust bearing member is fixedly positioned on the shaft 32 the intermediate finger portions 92 lie contact with the shaft periphery while the terminal portions 98 project radially in an outwardly inclined fashion, FIG. 2. Further, the tips of the flexible fingers extend axially beyond the end face 86 forming the thrust runner, such that portions 98 make initial contact under light thrust loads with the stationary thrust receiving disc 66. However, under relatively large axial thrust forces which are imposed upon the rotor, the rotor will shift to the extent that the flexible finger tips move into a right angle position within recess 88 to such an extent that the thrust runner or face 86 is in direct contact with the thrust receiving disc 66. Thus, the thrust plate or disc 66 bottoms out against the solid part of the thrust washer, that is the rigid surface 86.

Another important aspect of the unitary thrust bearing member 80, is the provision of a second annular recess 99 within opposite or inner end face 100 of hub 82, this recess being of such a configuration as to form a radially inclined or cone-shaped surface 102. The outer peripheral surface 104 of the disc is beveled, forming a thin wall portion 106. This thin wall portion 106 acts as an oil slinger; that is, lubricating oil which is centrifugally discharged from the rotating shaft 32 impinges upon the inclined surface 104 and is centrifugally pumped to the outer edge 108 where it is thrown into the circumferentially-spaced wick sections 70 to be carried by capillary action to the middle of sleeve bearing 36. In order to properly locate the unitary thrust bearing member or thrust washer 80 on the shaft and the thrust plate or disc 66, the shaft is peripherally grooved at 110 and caries a metal snapping 112 which prevents axial displacement of the thrust bearing member 80 inwardly along the shaft periphery. With the snap ring 112 in position, the end face 100 is in abutting contact with the snap ring and the flexible fingers 94, under light load conditions, barely contact the trust plate or disc 66 carried by the stator.

The manner of operation under light and heavy applied thrust loads, may be readily seen by a comparison of FIGS. 2 and 3. In FIG. 2, the thrust bearing arrangement is illustrated as being under relatively light axial load conditions, For example, in motors of the fractional horsepower size axial loads up to ten pounds thrust may be considered as relatively light. Assuming therefore that the flexible fingers 94 of the thrust members are designed to transmit and carry a thrust load up to ten pounds thrust, it may be seen that a light axial thrust in the direction of the arrow in FIG. 2 (toward the stationary thrust shoulder or plate 66,) will cause the fingers 94 to engage and to bear against the thrust plate 66 which acts as the thrust receiving means. Thus, although the flexible fingers are continuously biased against the thrust receiving means, axial movement in the direction of the arrow is still possible by the shaft and the rotor. However, such movement under light load conditions is fully resisted and controlled by the spring action of the individual flexible fingers 94 providing a cushioning effect on the axial travel of the shaft and the rotor. The washer 80 itself is prevented from vibrating between the stationary thrust surface and the movable thrust surface since it is in continuous contact with the stationary thrust face. This results in the elimination of objectionable knocking or bumping sounds due to vibration of the washer.

Of course, even under light axial thrust loads, the imperforate disclike member 80 is preventing the axial flow of lubricant and the oil which backs up on the shaft periphery is flung radially outwards under centrifugal force to impact the inclined surface 104 for recirculation. The cone-shaped section 106 is highly effective in directing oil under centrifugal force to its outer edge 108, where it frees itself and impacts radially against the wick sections 70. The member 80 due to its interference fit with the outer periphery of the shaft, provides an effective oil seal and prevents further creapage of oil along the shaft to the motor interior.

Under heavier axial loads, the flexible fingers 94 formed by slots 96 deform to the full extent shown in FIG. 3 where the flexible end portions 98 are at right angles to intermediate portions 92, and are received within the annular recess 88. With the resistance of the flexible fingers being overcome, the shaft and rotor assembly moves further in the direction of the arrow away from the stator. At this point, the annular thrust runner or surface 86 of hub 80 moves into abutting contact with the annular thrust plate 66 thereby supplementing the thrust being taken up by the flexible fingers 94. Transmission is thus directly between the thrust plate 66 carried by the stationary part of the machine and the thrust runner 86. The shaft 32 and the rotor 14 are prevented from moving in an axial direction away from the stator 12 therefore, during continuous operation of the motor under heavy axial loads. The one piece plastic cushion thrust washer 80 is held firmly between the thrust surface 60 of the plate 66 and the mounting ring 112, eliminating any possible vibration of the washer and end play of the shaft is effectively limited. Of course, any movement of the shaft and rotor in a direction away from the stationary thrust plate 66, will, lessen the thrust load on the flexible fingers of the thrust member 80 and the thrust runner 86 or rigid portion will be forced out of engagement with the thrust plate 66 when a ten pound thrust or less is once again attained.

With this arrangement, it is therefore apparent that during operation of the light and heavy axial loads, the unitary member 80 not only cushions axial movement of the shaft but controls and limits shaft end play, acts as an oil barrier for oil seepage along the shaft and performs the function of an oil slinger for directing oil into the capillary wick. Further, it positively limits axial shifting of the shaft under heavy axial loads, while effectively transmitting thrust loads in excess of that which causes full deflection of the flexible fingers.

Figures 7A, 7B, 7C:
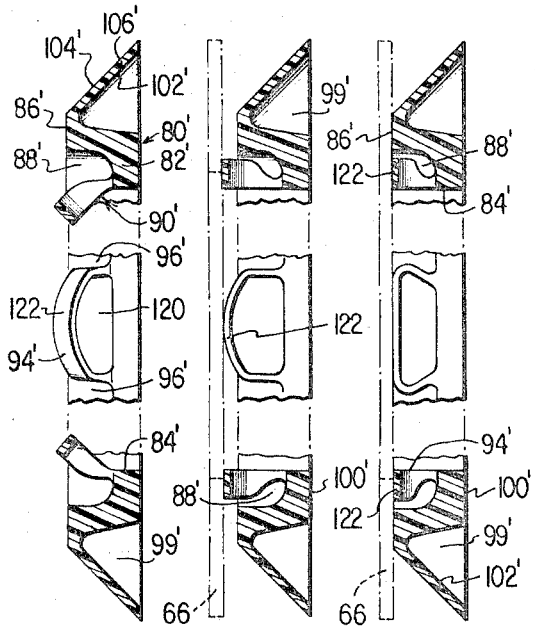
FIGS. 7a, 7b, and 7c are sectional views of an alternate form of bearing arrangement of the present invention with the bearing member in relaxed condition, under light axially applied thrust load and under heavy axially applied thrust load.

Turning to FIGS. 7a, 7b and 7c, an alternate form of unitary, plastic cushion thrust washer is shown at 80' which again includes a hub 82' an end face 86' which acts as the thrust runner, an annular recess 88' radially inward thereof which forms, in conjunction with a deformed flange portion 90' having circumferentially spaced slots 96', flexible finger portions 94'. Unlike those of the embodiment of FIGS. 4 and 5, fingers 94' are not solid, but carry apertures 120 to provide increased flexibility to the contact portion 122 of the individual fingers 94'. Fingers 94', in their free state, extend radially inward of bore 84' such that when the unitary plastic cushion thrust washer or member 80' is coupled to its shaft (not shown), FIG. 7b, the flexible finger portion 94' of the flange 90' flexes outwardly into the recess 88' such that the outer peripheral edge is in contact with the annular thrust plate 66. FIG. 7b therefor represents a light axial load condition. Referring next to FIG. 7c, under heavy load conditions, both the finger contact portion 122 and the thrust runner or end face 86' of washer 80' are in axially abutting contact with the stationary thrust receiving plate 66 with the spring fingers 94' thus bottomed out.

In addition to the peripheral recess 88', on the inner face of the bearing washer or member 80' there is provided a second annular recess 99' on the opposite face 100' which forms a radially inclined surface 102'. The inclined surface 102' acts in conjunction with beveled peripheral surface 104' of the disc to form a thin wall inclined portion 106' or oil slinger in similar fashion to the embodiment of FIGS. 4 and 5. The disclike unitary washer, is in a radial direction from said bore, imperforate, such that it functions to completely block lubricant seeping inwardly along the periphery of the shaft from the sleeve bearing.

Figures 8A, 8B, 8C:
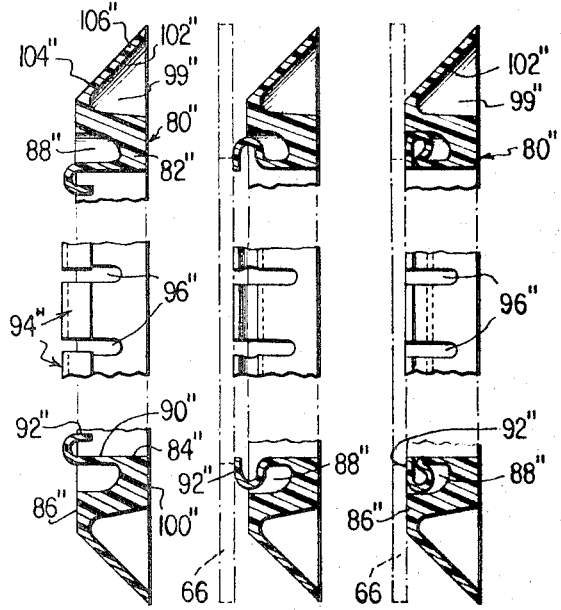
FIGS. 8a, 8b and 8c are partial sectional views of yet another form of cushion thrust washer of the present invention as relaxed, and under light and heavy loads respectively.

FIGS. 8a, 8b and 8c relate to a third embodiment of the present invention in which the unitary, plastic cushion thrust washer or member 80" is provided again with a hub 82" having formed in its outer end face 86" a first annular recess 88" which defines in conjunction with bore 84" a flange 90", slotted at 96", the free end 92" is bent reversely upon itself when in the relaxed position as shown prior to coupling to the shaft. The position shown in FIG. 8a is prior to mounting on the shaft. When coupled to the shaft, it occupies a position such as that shown in FIG. 8b in which case, the reverse bent portion 92" abuts the inner surface of the thrust plate 66 under lightly applied axial loads. Under full axial loading (that is in excess of ten pounds as an example), FIG. 8c, the multiple flexible fingers 94" formed by circumferentially spaced slots 96" move totally into recess 88" and thrust runner 86" abuts plate 66. Plate 66 then acts as a fixed stop to prevent additional axial movement from right to left of the rotor shaft assembly with respect to the stationary members of the machine. Of course, annular recess 88" is of a size sufficient to receive the flexible fingers 94" as fully distorted under the heavy axial loads imposed thereon.

In like manner to the previous embodiment, a second annular recess 99" is carried by the opposite end face 100" of the disclike one piece thrust washer, this recess defining inclined surface 102" which acts in conjunction with the beveled peripheral surface 104" to define the oil slinger 106" for the washer. Again, in both the alternative embodiments of the thrust washer, the material forming the same is preferably nylon or a material having a nylon component such as "-Nylatron GS."

From the above it is seen that in each embodiment a single compact part formed of self-lubricating material accomplishes four independent functions with the part being easily molded and without cross-moving cores. The thin wall skirt or envelope portion which forms the oil slinger 106, 106' and 106" in the several embodiments, overhangs the oil well flange. This is particularly important when the motor is oriented vertically such that the overhang insures that oil will drip into the sump space of the oil well cover, affording positive retention of lubricant when the shaft stops rotating.

Figure 6:
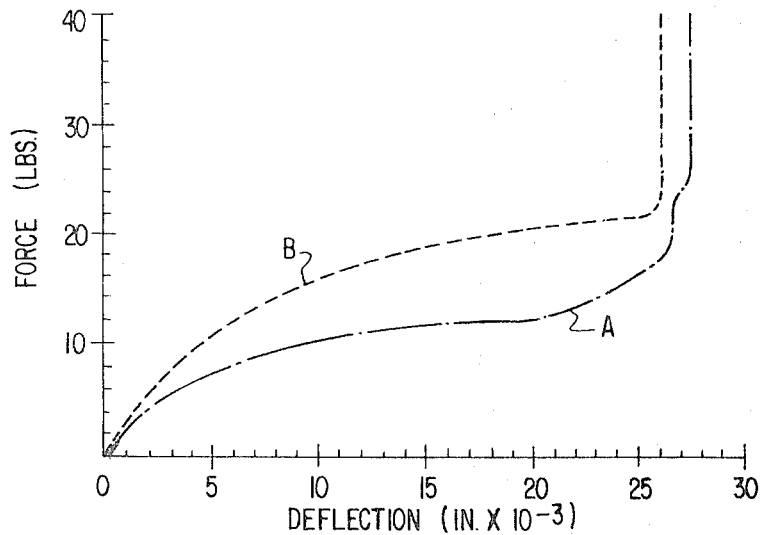
FIG. 6 is a plot of deflection against thrust force for the thrust bearing member of FIG. 4.

Reference to FIG. 6 shows the plot of deflection against force for a nylon washer constructed in accordance with the present invention. Since the unitary washer is formed of a synthetic material such as nylon it has some characteristic changes as a result of contact with moisture. For instance, it tends to offer more resistance to deflection when dry than wet. Curve A represents deflection of the fingers due to the application of force in terms of thousands of inches of deflection, when wet due to the contact with water. However, when the washer is again dry, it exhibits increased resistance to deflection as indicated by curve B. It is noted that for both curves upon the accumulation of sufficient force, the flexible finger portions of the washer bottom out and as such, the curve terminates in vertical lines indicating under a certain applied force somewhere between 25 and 30 pounds the fingers will be fully deflected and the thrust runner will contact the stationary thrust plate. Of course, depending upon the thickness of the spring fingers, the number of the same, the slot configuration, the type of material, etc. the deflection characteristics of the individual washers will change but at some applied force, the fingers will be fully deflected.

I claim:

1. A unitary thrust bearing member for use in electric motors having rotatable parts, said member comprising: a unitary disc including a hub portion and having an axially extending bore arranged to mount said member on a motor shaft, a first annular recess formed within one end face of said disc, a flexible thin wall flange formed by said recess and said bore and having an axial length in excess to that of the remainder of said hub portion, said flange being slotted at circumferentially spaced points to form resilient fingers with the ends of said fingers extending radially inward prior to placement of said hub portion on said shaft, said one end face including a rigid portion acting as a thrust runner, said other end face including an outwardly inclined circumferential surface for slinging collected lubrication oil radially outwards, and said disc further including a radially imperforate portion forming an axial oil barrier for oil seeping along the shaft periphery.

2. The unitary thrust bearing member as claimed in claim 1 wherein said bearing member is formed of nylon.

3. The unitary thrust bearing member as claimed in claim 1 wherein said bearing member is formed of a tough, wear resistant material having a self lubricating property.

4. The unitary thrust bearing member as claimed in claim 1 wherein said other end face carries a second annular recess to define said outwardly inclined circumferential surface.

5. The unitary thrust bearing member as claimed in claim 1 wherein said fingers carry reversely turned ends whose terminal portions define an internal diameter smaller than the diameter of the shaft receiving the same.

6. The unitary thrust bearing member as claimed in claim 1 wherein said multiple resilient fingers terminate in radially inwardly inclined ends whose peripheral edges define a diameter less than the diameter of the shaft receiving the same.

7. The unitary thrust bearing member as claimed in claim 6 whose fingers are internally apertured to increase the resilience of the same.

8. In an electric motor, a shaft, a rotor fixably secured on said shaft, sleeve bearing means for rotatably supporting said shaft, stationary thrust receiving means, a unitary thrust member mounted on said shaft between said rotor and said thrust receiving means, said thrust member including a radially imperforate portion forming an oil barrier for oil seeping inwardly along the rotor shaft from said sleeve bearing means, a radially inclined surface for slinging lubrication oil which is received from said shaft during rotation, an axially extending flexible portion forming axial spring means adapted to contact said thrust receiving means and a second rigid, radial surface forming a thrust runner for said unitary thrust member and adapted to contact said thrust receiving means.

9. The electric motor as claimed in claim 8 wherein said thrust member comprises a nylon molding.

10. The electric motor as claimed in claim 8 wherein said thrust member comprises a molding of tough, wear resistant material having a self lubricating property.

11. The electric motor as claimed in claim 8 wherein said thrust member comprises a configured disc including a hub portion having an outer face which carries a first annular recess to define the hub bore, a thin annular flange in contact with the shaft periphery with the flange extending axially beyond the hub portion, said flange being slit at spaced circumferential positions to form multiple thin, flexible fingers such that the outer ends of said fingers initially contact the stationary thrust receiving means at low thrust loads but are bent at right angles into said first recess during heavy axial loading with the face of the hub member adjacent said first recess in contact with the stationary thrust receiving means.

12. The electric motor as claimed in claim 11 wherein the outer end surface of said hub portion, radially beyond said annular recess forms the thrust runner which abuts the stationary thrust receiving means under high axial loading and full deflection of said resilient fingers.

13. The electric motor as claimed in claim 12 wherein the other end surfaces of said hub portion carry a second annular recess which defines said radially inclined oil flow surface.

14. The electric motor as claimed in claim 8 wherein said individual fingers are internally apertured to increase the resilience of the same.